US010329934B2

(12) United States Patent
Blaney et al.

(10) Patent No.: US 10,329,934 B2
(45) Date of Patent: Jun. 25, 2019

(54) REVERSIBLE FLOW BLADE OUTER AIR SEAL

(71) Applicant: UNITED TECHNOLOGIES CORPORATION, Hartford, CT (US)

(72) Inventors: Ken F Blaney, Middleton, NH (US); Anthony B Swift, North Waterboro, ME (US); Neil L Tatman, Brentwood, NH (US); Paul M Lutjen, Kennebunkport, ME (US); Christopher M Jarochym, Ogunquit, ME (US)

(73) Assignee: United Technologies Corporation, Farmington, CT (US)

(*) Notice: Subject to any disclaimer, the term of this patent is extended or adjusted under 35 U.S.C. 154(b) by 598 days.

(21) Appl. No.: 14/880,403

(22) Filed: Oct. 12, 2015

(65) Prior Publication Data

US 2016/0169016 A1   Jun. 16, 2016

Related U.S. Application Data

(60) Provisional application No. 62/091,880, filed on Dec. 15, 2014.

(51) Int. Cl.
| | | |
|---|---|---|
| *F01D 11/08* | (2006.01) | |
| *F01D 9/06* | (2006.01) | |
| *B22C 9/10* | (2006.01) | |
| *F01D 11/12* | (2006.01) | |
| *F01D 25/24* | (2006.01) | |

(52) U.S. Cl.
CPC ............... *F01D 9/065* (2013.01); *B22C 9/10* (2013.01); *F01D 11/08* (2013.01); *F01D 11/122* (2013.01); *F01D 25/246* (2013.01); *F05D 2230/211* (2013.01); *F05D 2240/11* (2013.01); *F05D 2260/204* (2013.01); *Y02T 50/676* (2013.01)

(58) Field of Classification Search
None
See application file for complete search history.

(56) References Cited

U.S. PATENT DOCUMENTS

| | | | |
|---|---|---|---|
| 4,526,226 A | 7/1985 | Hsia et al. | |
| 5,486,090 A | 1/1996 | Thompson et al. | |
| 5,584,651 A * | 12/1996 | Pietraszkiewicz | F01D 11/08 415/115 |

(Continued)

FOREIGN PATENT DOCUMENTS

| | | |
|---|---|---|
| EP | 1213444 | 6/2002 |
| EP | 1 245 792 | 10/2002 |

(Continued)

OTHER PUBLICATIONS

Partial European search report for application No. EP 15 18 9830.1-1610 dated Apr. 12, 2016.

(Continued)

*Primary Examiner* — Woody A Lee, Jr.
*Assistant Examiner* — Jason A Fountain
(74) *Attorney, Agent, or Firm* — Bachman & LaPointe, P.C.

(57) ABSTRACT

A casting core for a Blade Outer Air Seal includes a heat exchange cavity core section in communication with a first plenum section and a second plenum section, the first plenum and the second plenum section are of a thickness greater than the heat exchange cavity section.

20 Claims, 9 Drawing Sheets

(56) References Cited

U.S. PATENT DOCUMENTS

| | | | |
|---|---|---|---|
| 5,609,469 A | 3/1997 | Worley et al. | |
| 5,649,806 A * | 7/1997 | Scricca | F01D 11/08 415/115 |
| 5,993,150 A | 11/1999 | Liotta et al. | |
| 6,146,091 A | 11/2000 | Watanabe et al. | |
| 6,705,831 B2 | 3/2004 | Draper | |
| 6,742,783 B1 * | 6/2004 | Lawer | F01D 11/08 277/412 |
| 6,905,302 B2 * | 6/2005 | Lee | F01D 5/288 415/115 |
| 7,033,138 B2 | 4/2006 | Tomita et al. | |
| 7,306,424 B2 | 12/2007 | Romanov et al. | |
| 7,334,985 B2 | 2/2008 | Lutjen et al. | |
| 7,621,719 B2 | 11/2009 | Lutjen et al. | |
| 7,650,926 B2 | 1/2010 | Tholen | |
| 7,665,961 B2 | 2/2010 | Lutjen et al. | |
| 7,686,068 B2 * | 3/2010 | Tholen et al. | |
| 7,763,356 B2 * | 7/2010 | Berczik | C22C 27/04 427/372.2 |
| 7,874,792 B2 | 1/2011 | Tholen et al. | |
| 7,959,407 B2 | 6/2011 | Tholen | |
| 8,061,146 B2 | 11/2011 | Joe et al. | |
| 8,128,348 B2 | 3/2012 | Lutjen et al. | |
| 8,128,349 B2 | 3/2012 | Lutjen et al. | |
| 8,128,366 B2 | 3/2012 | Strock et al. | |
| 8,177,492 B2 | 5/2012 | Knapp et al. | |
| 8,206,092 B2 | 6/2012 | Tholen et al. | |
| 8,529,201 B2 | 9/2013 | Lutjen et al. | |
| 8,534,993 B2 | 9/2013 | Lutjen et al. | |
| 8,535,783 B2 | 9/2013 | Lutjen et al. | |
| 8,556,575 B2 | 10/2013 | Knapp et al. | |
| 2004/0090013 A1 | 5/2004 | Lawer et al. | |
| 2005/0220619 A1 | 10/2005 | Self et al. | |
| 2007/0041827 A1 | 2/2007 | Camus | |
| 2007/0248462 A1 | 10/2007 | Lutjen et al. | |
| 2008/0079523 A1 | 4/2008 | Tholen | |
| 2010/0054914 A1 | 3/2010 | Tholen et al. | |
| 2010/0080707 A1 | 4/2010 | Tholen | |
| 2010/0104859 A1 * | 4/2010 | Berczik | C22C 27/04 428/332 |
| 2013/0056143 A1 * | 3/2013 | Cuttell | B23K 26/382 156/250 |
| 2013/0340966 A1 * | 12/2013 | Tholen | B22C 9/103 164/6 |

FOREIGN PATENT DOCUMENTS

| | | |
|---|---|---|
| EP | 1541809 | 6/2005 |
| EP | 1905958 | 4/2008 |

OTHER PUBLICATIONS

European search report for application No. 15 18 9830.1 dated Jul. 15, 2016.

* cited by examiner

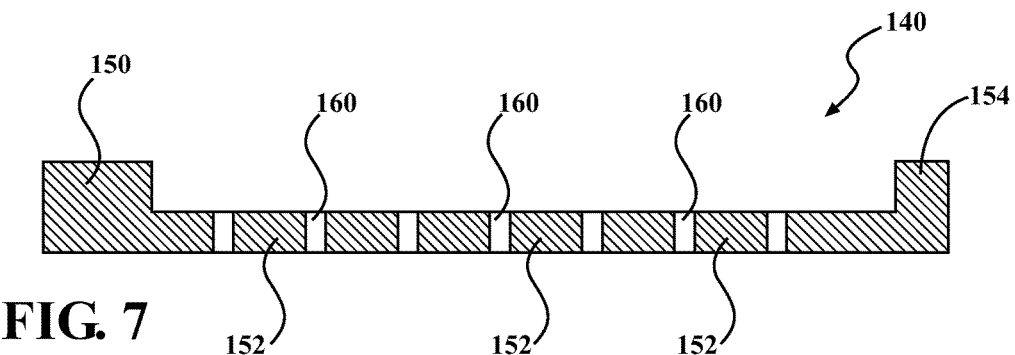
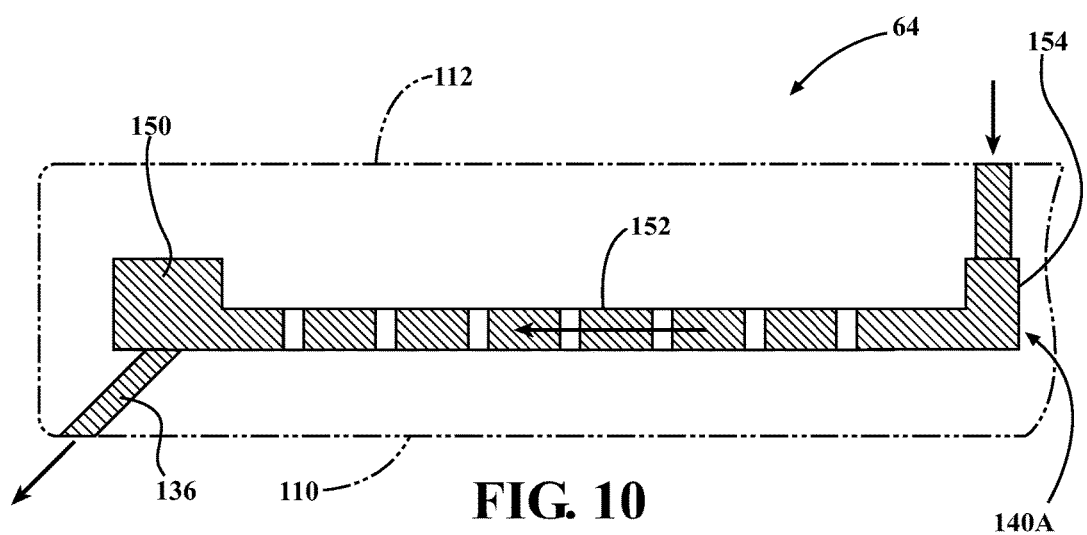
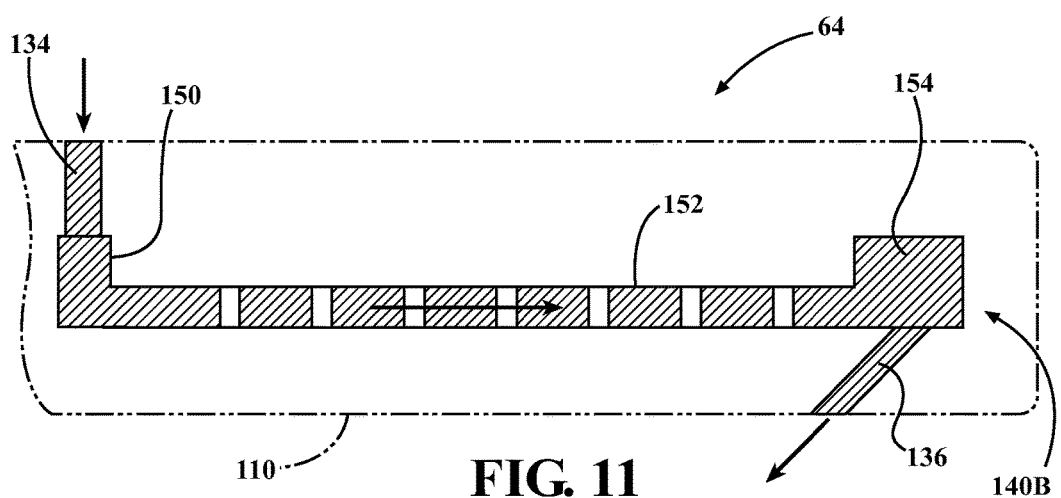

REVERSIBLE FLOW BLADE OUTER AIR SEAL

CROSS REFERENCE TO RELATED APPLICATION

This application claims the benefit of provisional application Ser. No. 62/091,880, filed Dec. 15, 2014.

STATEMENT REGARDING FEDERALLY SPONSORED RESEARCH OR DEVELOPMENT

This disclosure was made with Government support under FA8650-09-D-2923 0021 awarded by The United States Air Force. The Government has certain rights in this disclosure.

BACKGROUND

The present disclosure relates to Blade Outer Air Seals, more particularly, to casting cores for blade outer air seals (BOAS).

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section may produce a circumferential temperature pattern referred to as a pattern factor that may result in hot and cold streaks in the turbine section. Stationary components such as Blade Outer Air Seals (BOAS) within the turbine section operate at the local pattern temperature and may be internally cooled by bleed air. For example, there may be an upstream-to-downstream array of cooling passageways within the BOAS. Cooling air may be fed into the array from the outboard side of the BOAS then may exit through outlet ports in the circumferential ends (matefaces) of the BOAS so as to be vented into the adjacent intersegment region and also exit out the gas path radial surface to create film cooling. The vented air cools adjacent BOAS segments and purges the circumferential gap between adjacent BOAS segments to prevent gas ingestion.

The BOAS segments may be cast via an investment casting process. In an exemplary casting process, a casting core is used to form the cooling array. The core is located in a die and wax is molded in the die over the core to form a pattern. The pattern is then shelled (e.g., a stuccoing process to form a ceramic shell) and the wax removed from the shell. Metal is then cast in the shell over the core. The shell and core are then destructively removed. After core removal, the core forms the cooling passageway array in the casting. The as-cast passageway may be open in the raw BOAS casting. At least some of the end openings are closed via plug welding, braze pins, or other processes.

Typically, one type of cooling scheme has been utilized across the BOAS. However, the cooling requirement varies across the BOAS as a pressure ratio between the cooling air and the working air is low at the leading edge, and greater at the trailing edge. Traditionally, casting cores are refractory metal cores (RMCs) that are laser cut from a metallic sheet of constant thickness with inlets and exits passaged defined thereby and formed via bending to define as-cast inlet and exit passages. Although effective, this requires the flow path to be predetermined for a BOAS core during a development cycle since any significant change requires revision to the casting tooling.

SUMMARY

A casting core for a Blade Outer Air Seal according to one disclosed non-limiting embodiment of the present disclosure includes, a first plenum section, a second plenum section, and a heat exchange cavity core section in communication with the first plenum section and the second plenum section, the first plenum and the second plenum section are of a thickness greater than the heat exchange cavity section.

A further embodiment of the present disclosure includes the casting core, wherein the heat exchange cavity core section includes a multiple of pedestals defining a tortuous airflow path.

A further embodiment of any of the foregoing embodiments of the present disclosure includes, wherein the heat exchange cavity core section includes a multiple of elongated strips defining a tortuous airflow path.

A further embodiment of any of the foregoing embodiments of the present disclosure includes, wherein the first plenum and the second plenum section are of a thickness to receive a laser drill.

A further embodiment of any of the foregoing embodiments of the present disclosure includes, wherein the heat exchange cavity core section is machined.

A Blade Outer Air Seal according to another disclosed non-limiting embodiment of the present disclosure includes a first plenum section with a first multiple of passages, a second plenum section with a second multiple of passages, and a heat exchange cavity section in communication with at least one of the first multiple of passages, and at least one of the second multiple of passages.

A further embodiment of any of the foregoing embodiments of the present disclosure includes, wherein the first plenum section and the second plenum section each has a respective thickness greater than a thickness of the heat exchange cavity section.

A further embodiment of any of the foregoing embodiments of the present disclosure includes, wherein the first multiple of passages are inlet passages through an outer face.

A further embodiment of any of the foregoing embodiments of the present disclosure includes, wherein the second multiple of passages are exit passages through an inner face.

A further embodiment of any of the foregoing embodiments of the present disclosure includes, wherein the second multiple of passages are inlet passages through an outer face.

A further embodiment of any of the foregoing embodiments of the present disclosure includes, wherein the first multiple of passages are exit passages through an inner face.

A further embodiment of any of the foregoing embodiments of the present disclosure includes, wherein at least one of the first and second multiple of passages are inlet passages and the other of the first and second multiple of passages are outlet passages.

A further embodiment of any of the foregoing embodiments of the present disclosure includes, wherein the heat exchange cavity section includes a multiple of pedestals.

A further embodiment of any of the foregoing embodiments of the present disclosure includes, wherein the heat exchange cavity section includes a multiple of elongated strips.

A further embodiment of any of the foregoing embodiments of the present disclosure includes, wherein the first plenum and the second plenum section are of a thickness configured to receive a drill.

A further embodiment of any of the foregoing embodiments of the present disclosure includes, wherein the heat exchange cavity core section is of a thickness that prohibit receipt of a drill.

A method of manufacturing a Blade Outer Air Seal according to another disclosed non-limiting embodiment of the present disclosure includes forming a casting core with a heat exchange cavity section in communication with a first plenum section and a second plenum section, the first plenum section and the second plenum section having a thickness greater than a thickness of the heat exchange cavity section, and drilling a first multiple of passages into the first plenum section and a second multiple of passages into the second plenum section.

A further embodiment of any of the foregoing embodiments of the present disclosure includes, wherein the first multiple of passages are inlet passages through an outer face and the second multiple of passages are exit passages through an inner face to form a forward airflow direction.

A further embodiment of any of the foregoing embodiments of the present disclosure includes, wherein the second multiple of passages are inlet passages through an outer face and the first multiple of passages are exit passages through an inner face to form an aft airflow direction.

A further embodiment of any of the foregoing embodiments of the present disclosure includes, wherein forming the heat exchange cavity core section includes machining the heat exchange cavity core section of the casting core.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 7 is a sectional view of a section of the cooling passage network;

FIG. 10 is a sectional view of one section of the cooling network drilled for a forward aft airflow path direction; and FIG. 11 is a section view of one section of the cooling network drilled for a forward aft airflow path direction.

DETAILED DESCRIPTION

Figure 1:
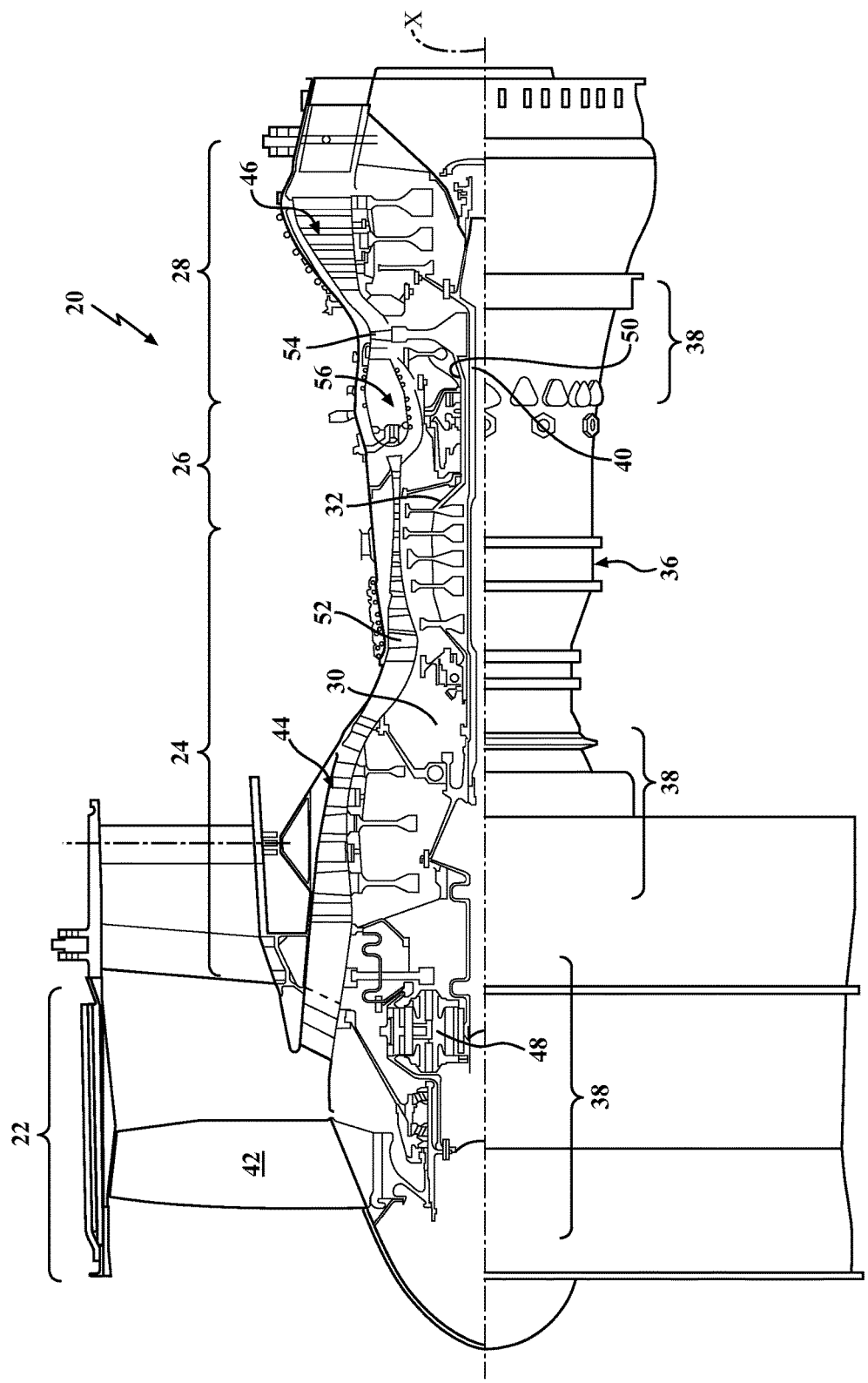
FIG. 1 is a schematic cross-section of an example gas turbine engine architecture.
Figure 2:
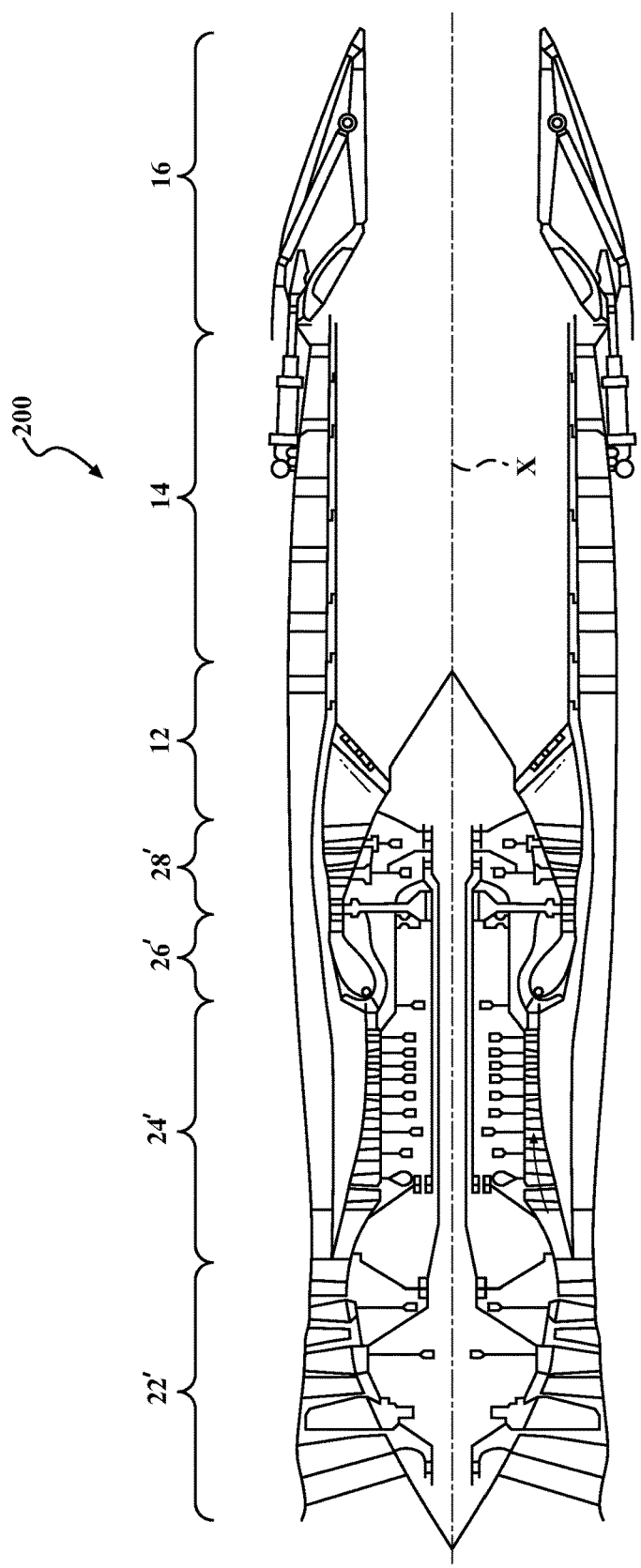
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 (FIG. 2) among other systems or features. The fan section 22 drives air along a bypass flowpath and a core flow path for further compression in the compressor section 24. The core flow is then communicated into the combustor section 26, where it is burned; then expanded through the turbine section 28. Although depicted as a turbofan in the disclosed non-limiting embodiment, it should be understood that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X.

Core airflow is compressed by the LPC 44 then the HPC 52, mixed with the fuel and burned in the combustor 56, then expanded over the HPT 54 and the LPT 46. The PT 46 and HPT 54 rotationally drive the respective low spool 30 and high spool 32 in response to the expansion. The main engine shafts 40, 50 are supported at a plurality of locations by bearing structures 38 within the static structure 36.

Figure 3:
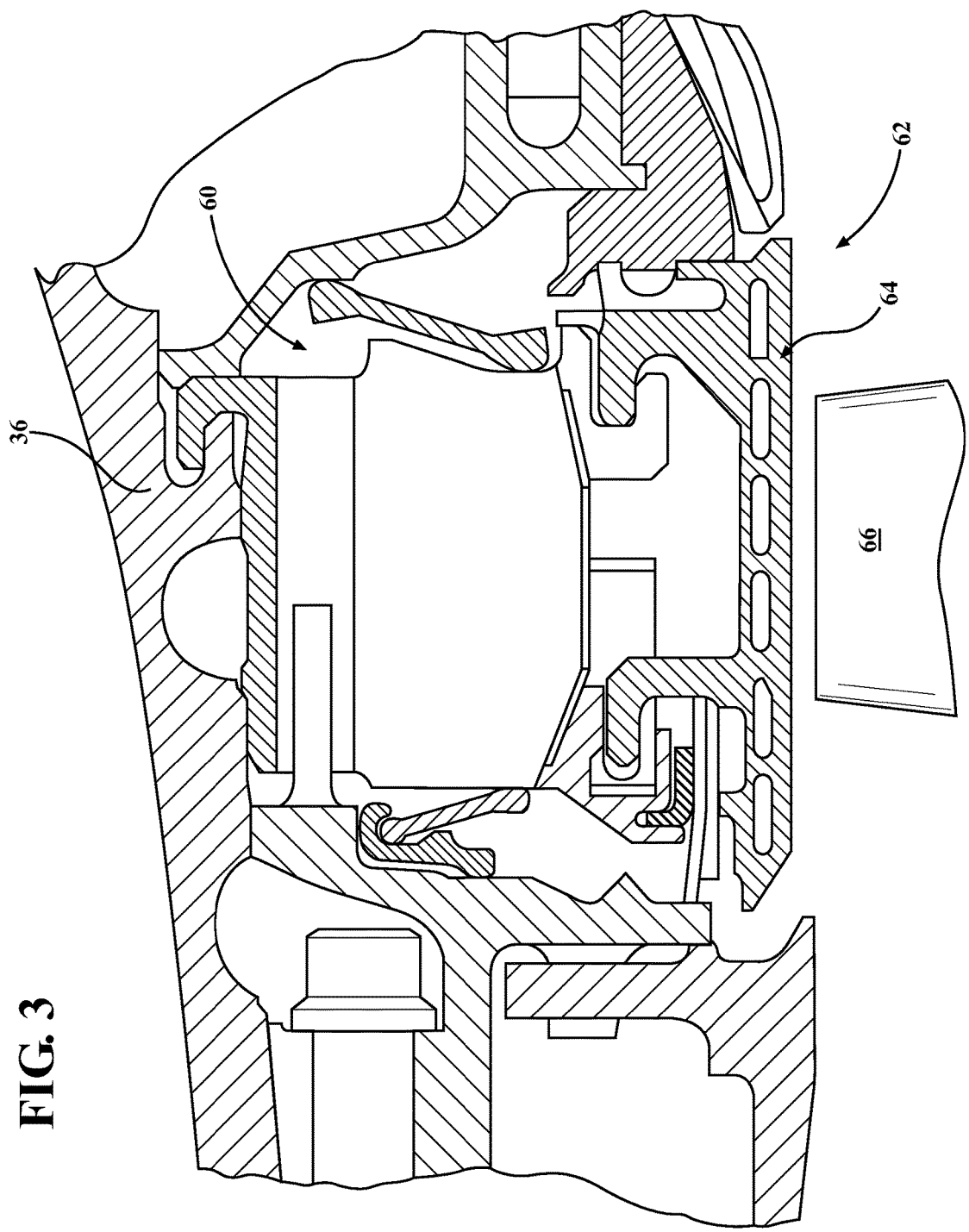
FIG. 3 is an enlarged schematic cross-section of an engine turbine section.

With reference to FIG. 3, an enlarged schematic view of a portion of the turbine section 28 is shown by way of example; however, other engine sections will also benefit herefrom. A shroud assembly 60 within the engine case structure 36 supports a Blade Outer Air Seal (BOAS) assembly 62. The BOAS assembly 62 includes a multiple of circumferentially distributed BOAS 64 proximate to a rotor assembly 66 (one shown schematically and partially).

Figure 4:
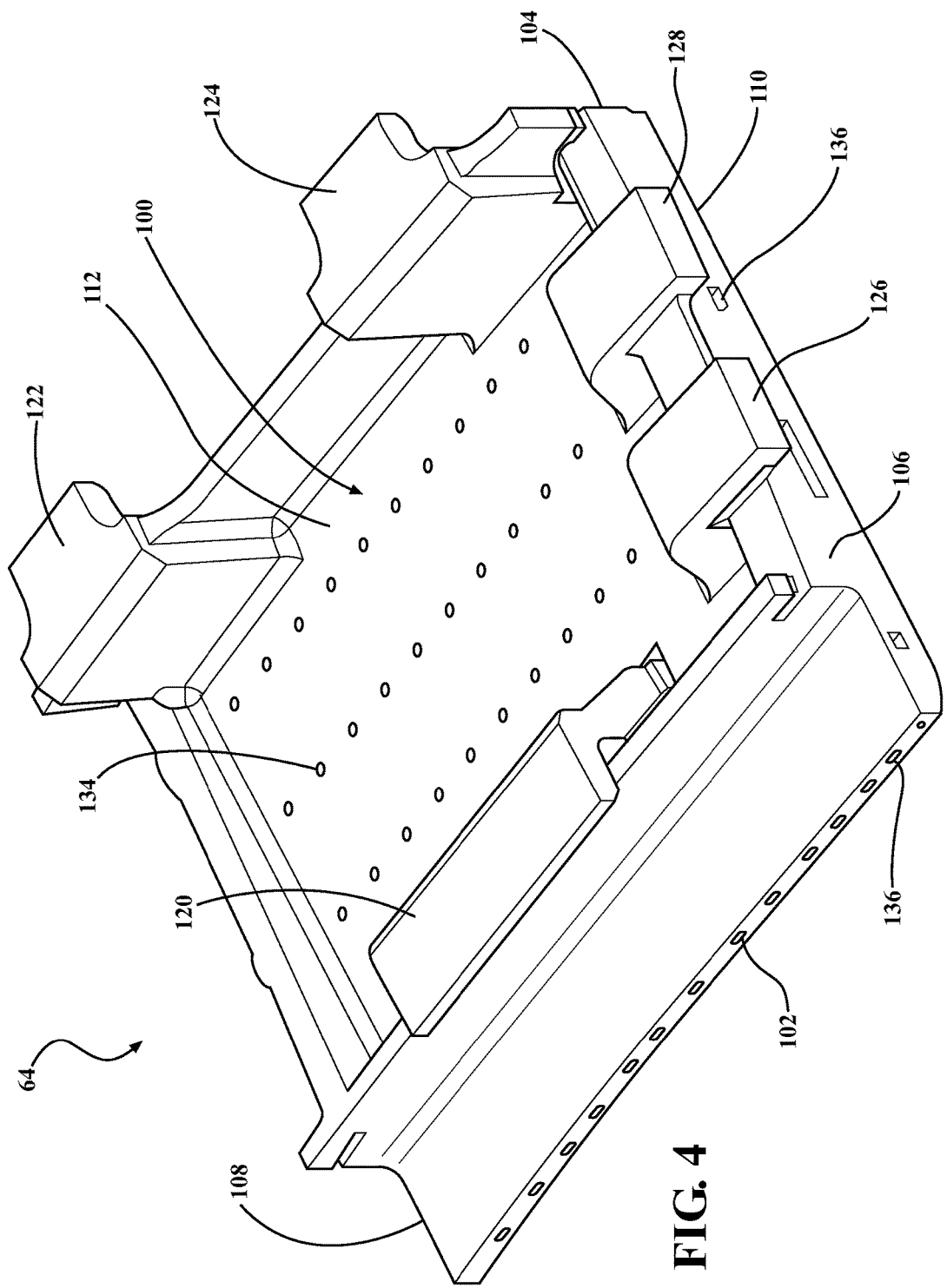
FIG. 4 is a perspective view of a BOAS.

With reference to FIG. 4, each BOAS 64 has a main body portion 100 with a leading edge 102, a trailing edge 104, respective circumferential mate face sides 106, 108, an inner face 110 and an outer face 112. The BOAS 64 is engaged with the engine static shroud assembly 60 (FIG. 3) via a plurality of mounting hooks. The exemplary BOAS has a single central forward mounting hook 120, a pair of first and second aft hooks 122, 124, and fore and aft hooks 126, 128 adjacent to the circumferential mate faces side 106 which, when assembled in a circumferential ring array of a plurality of the BOAS 64, interlock with the circumferential mate faces sides 108 of the adjacent BOAS. The circumferential ring array of the BOAS 64 encircles an associated blade stage of a gas turbine engine (FIG. 3). The assembled inner faces 110 thus locally bound an outboard extreme of the core flowpath.

Figure 5:
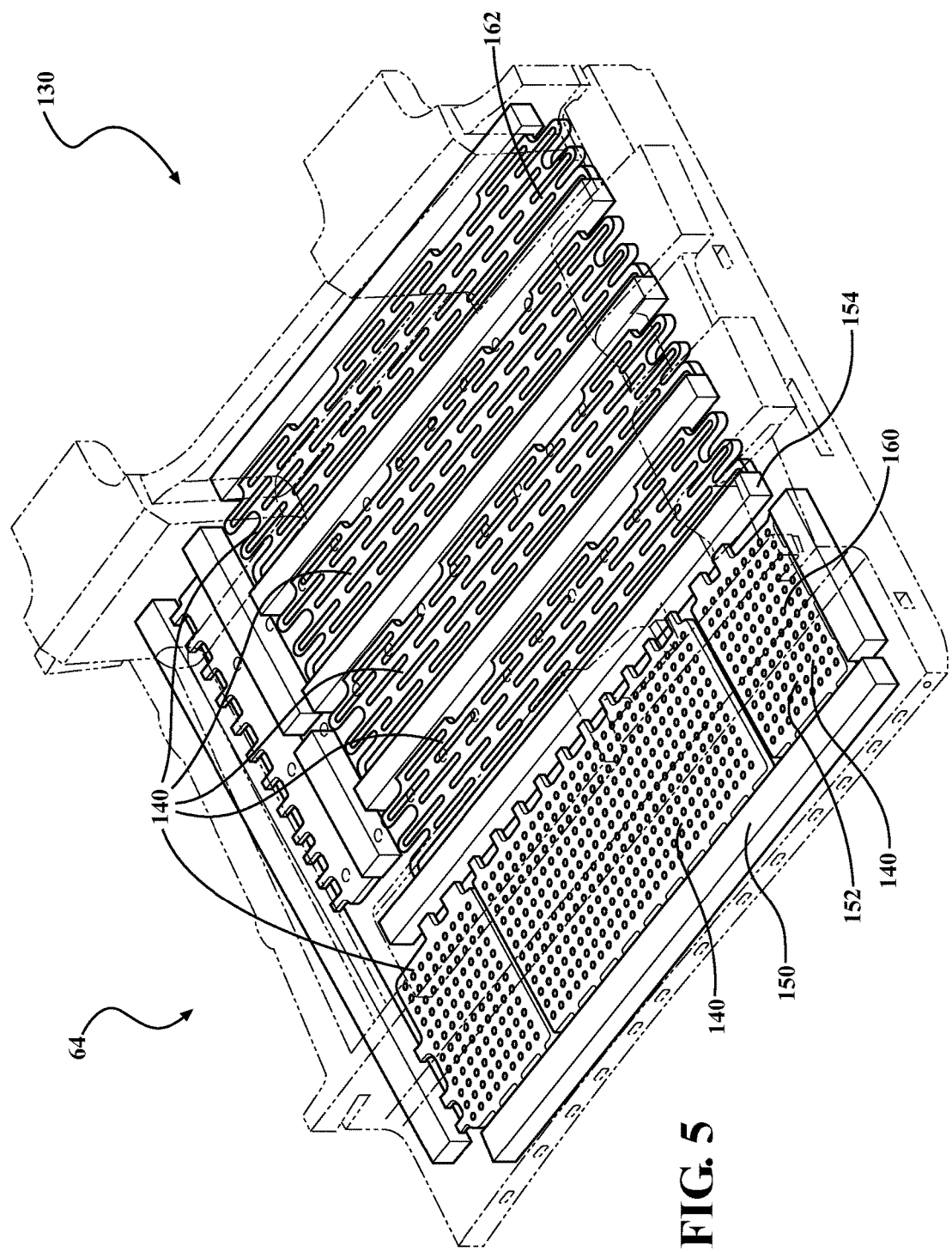
FIG. 5 is a perspective view of BOAS illustrating a cooling passageway.

With reference to FIG. 5, each BOAS 64 is typically air-cooled via an internal cooling passageway network 130. For example, bleed air from the compressor section 24 may be directed through a multiple of inlet passages 134 to the internal cooling passageway network 130 then exhausted through a multiple of outlets passages 136 (FIG. 4). Example inlet passages 134 may communicate through the outer face 112 and the multiple of outlets passages 136 may communicate through the circumferential mate faces sides 106, 108, the inner face 110, and/or the leading edge 102. As will be appreciated, the cooling requirements and the fluid dynamics of the cooling air change between the leading edge 102 and the trailing edge 104.

Figure 6:
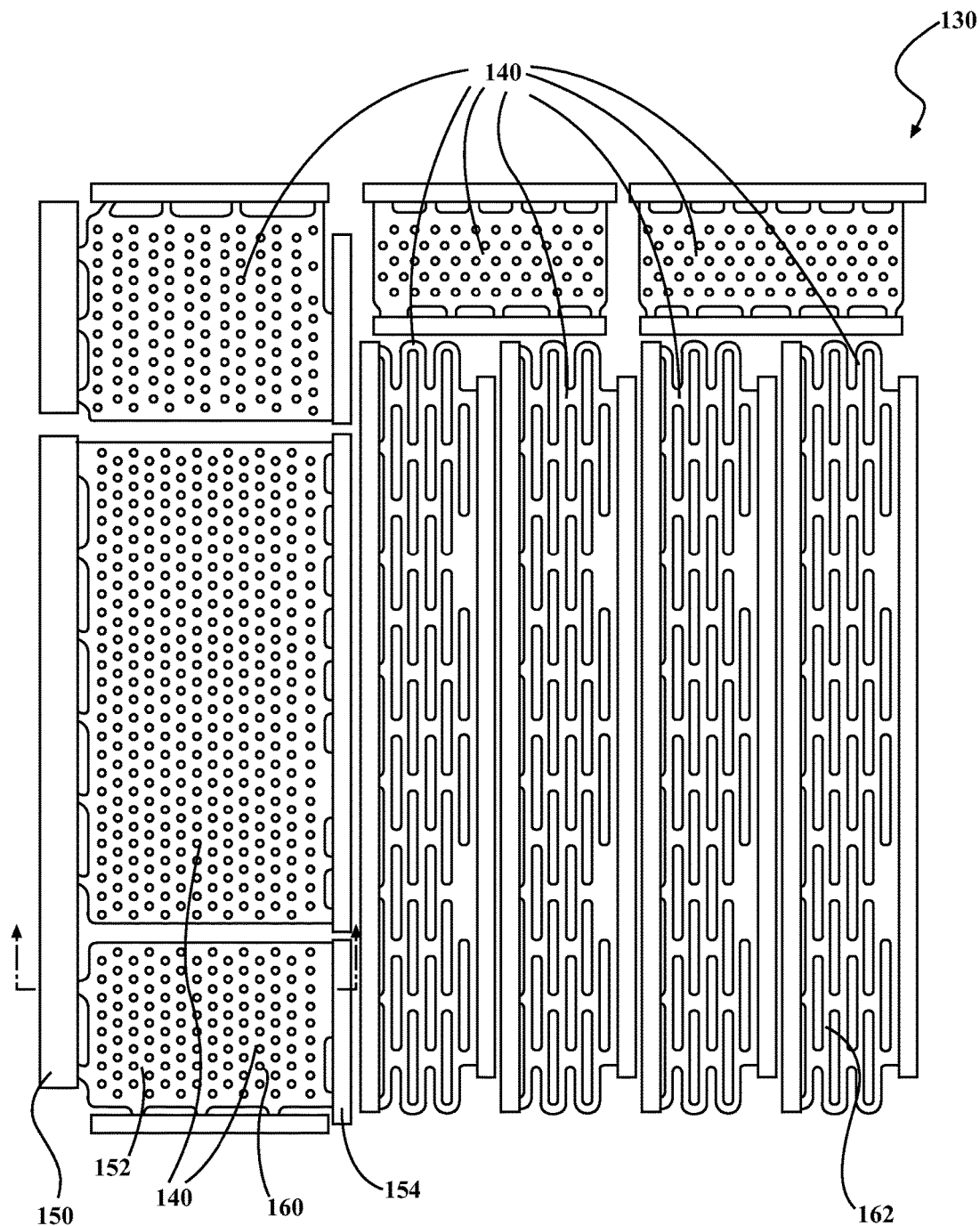
FIG. 6 is a plan view of the cooling passageway network of the BOAS.

With reference to FIG. 6, the internal cooling passageway network 130 may include a multiple of distinct internal cooling passage sections 140 (nine shown). Each of the internal cooling passage sections 140 generally includes a first plenum section 150, heat exchange cavity core sections 152, and second plenum section 154 (FIG. 7). The first and second plenum sections 150, 154, in one disclosed non-limiting embodiment, may be relatively thicker than, and communicate with, the heat exchange cavity core sections 152. It should be appreciated that the core internal cooling passageway network 130 can be reversible even if the heat exchange cavity core sections 152 are equal in thickness to the plenum sections 150, 154. The heat exchange cavity core sections 152 may include a multiple of pedestals 160, elongated strips 162 and/or other features to define a tortuous airflow path between the respective first and second plenum sections 150, 154 of a respective section 140 to essentially form a heat exchanger.

The pedestal type cooling schemes result in a pressure drop, and thus relatively high pressure air will be exiting the outlets passages 136 and into the gap between this BOAS 64 and an adjacent one. In this manner, the relatively high pressure air will purge leakage air away from the gap. The heat exchange cavity sections 152 increase the heat transfer surface area and turbulence to provide more efficient and effective cooling. The heat exchange cavity core section 152 is essentially a compact heat exchanger section that is formed relatively thin in a radially outer dimension (into the plane of FIG. 6). In this manner, relatively small cooling sections can be provided and can be tailored to the individual challenges of a particular area of the BOAS 64.

Figure 8:
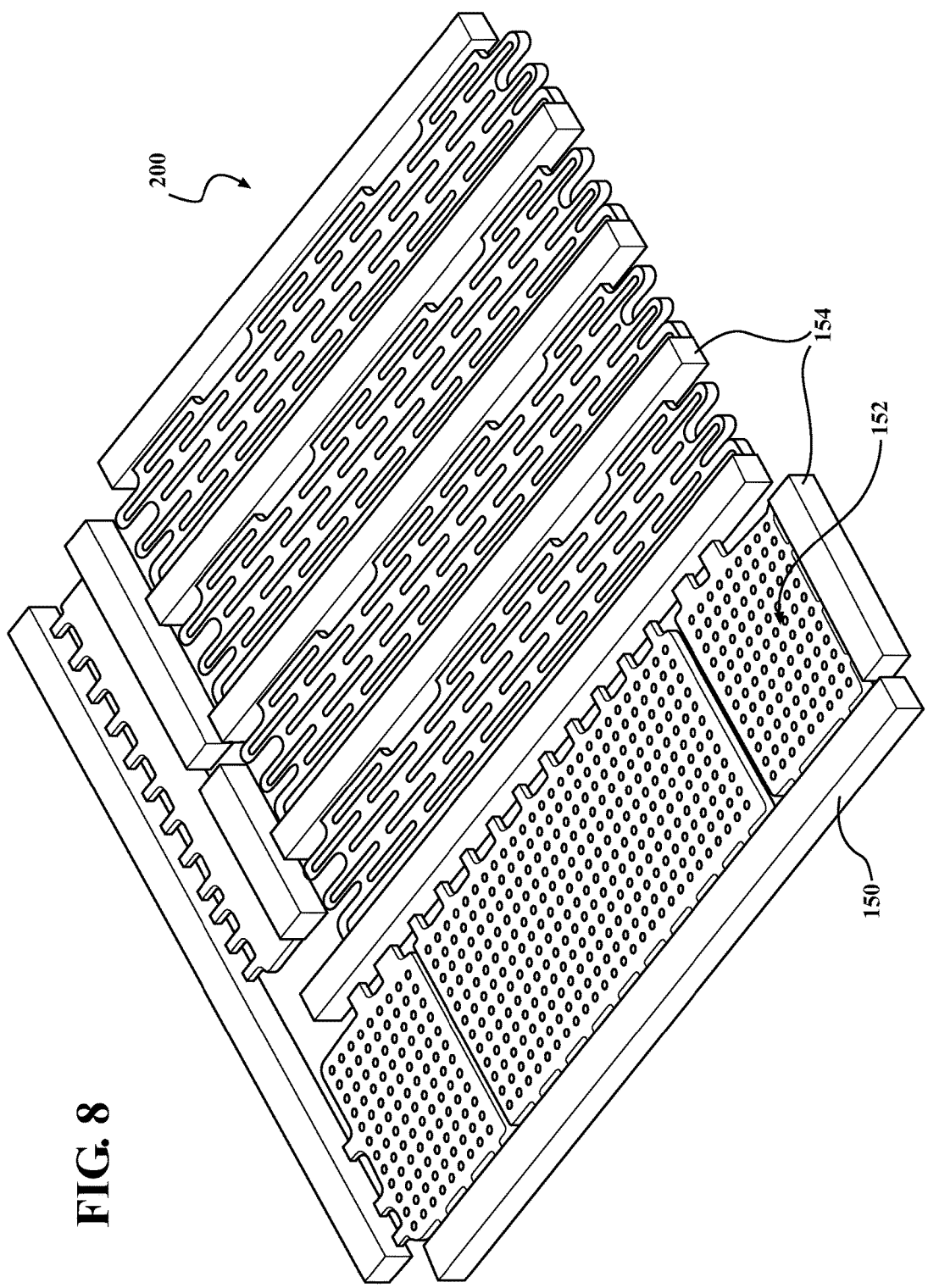
FIG. 8 is a perspective view of the casting cores.

The internal cooling passageway network 130, in one disclosed non-limiting embodiment, may be formed as a casting core 200 (FIG. 8) of a refractory metal of a desired thickness of the first and second plenum sections 150, 154, the heat exchange cavity core sections 152 are then machined to be of a reduced thickness to facilitate heat exchange operation. The desired thickness of the first and second plenum sections 150, 154 is generally defined by that which permits a drilling operation, inclusive of a laser drilling operation, into the first and second plenum sections 150, 154 as existing drilling technologies may not be practical for the relatively thin area preferred for the heat exchange cavity core sections 152. It should be appreciated that FIG. 8 actually shows a "mirror" of the cooling passageway network 130 of FIG. 5. Notably, FIG. 5 includes reference numerals that are identical to those in FIG. 8, even though what is actually shown in FIG. 8 is this casting core 200 rather than the actual cooling passages.

Figure 9:
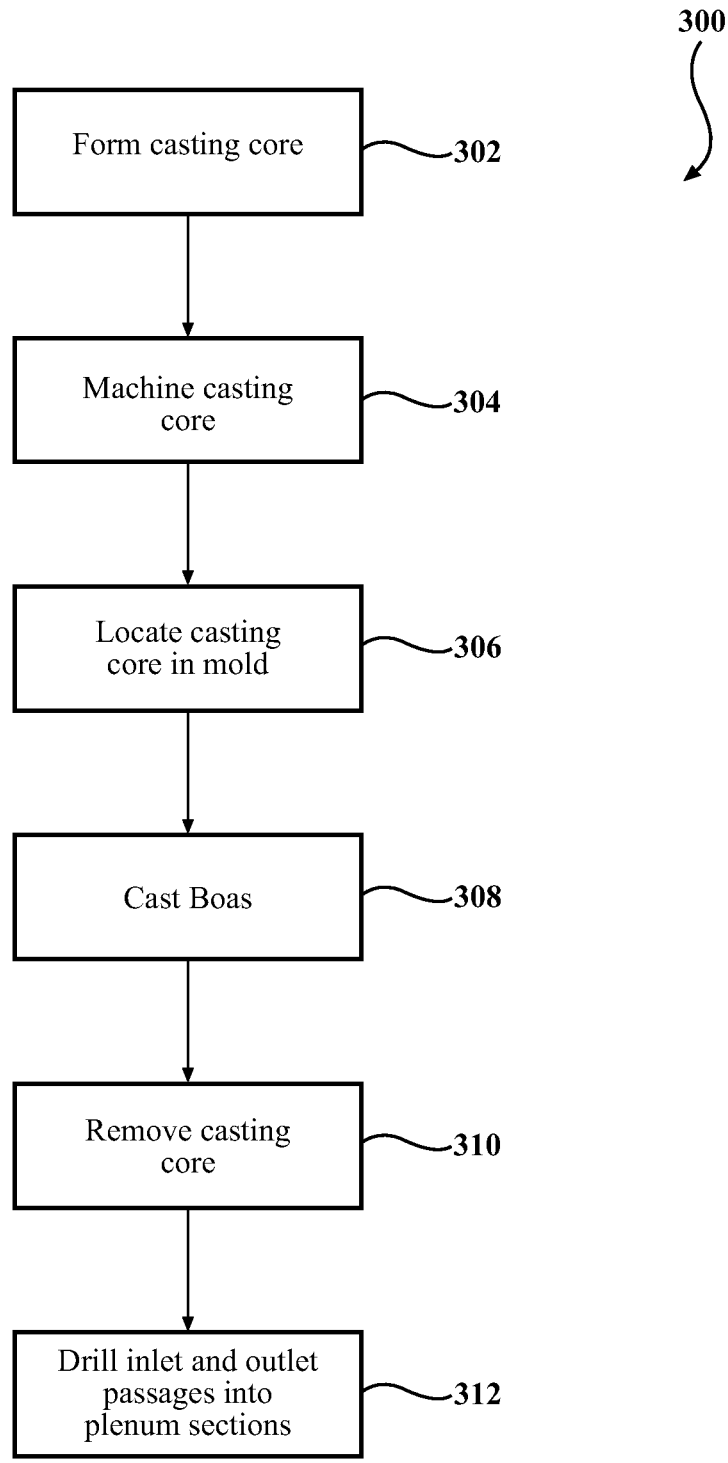
FIG. 9 is a method of manufacturing the cooling passage network.

With reference to FIG. 9, a method 300 for manufacture of the BOAS 64 initially includes forming the casting core 200 (FIG. 8) of a refractory metal of a desired thickness to form the first and second plenum sections 150, 154 (step 302). That is, the first and second plenum sections 150, 154 and the heat exchange cavity sections 152 may be cast or otherwise manufactured to be of a generally consistent thickness.

Next, to form the thickness differential between the first and second plenum sections 150, 154, and the heat exchange cavity sections 152, the heat exchange cavity section 152 may be machined (step 304). That is, the thickness of the heat exchange cavity section 152 is reduced. Alternatively, the first and second plenum sections 150, 154 may be machined to further control the thickness thereof to achieve a desired more specific thickness tolerance thereof.

Next, the casting core 200 is located within a mold to form the BOAS 64 (Step 306). To resist the high temperature stress environment in the gas path of a turbine engine, each BOAS 64 may be formed by casting and is typically manufactured of a nickel-base alloy, and more preferably are a nickel-base superalloy (Step 308). A nickel-base alloy has more nickel than any other element, and a nickel-base superalloy is a nickel-base alloy that is strengthened by the precipitation of gamma prime or a related phase.

Once material has formed around this the casting core 200 (Step 308), the casting core 200 may be leached out (Step 310) of the material that forms the BOAS 64, to define the internal cooling passageway network 130. That is, the first and second plenum sections 150, 154, and the heat exchange cavity core sections 152, are formed cavities therein to provide the cooling air passages.

Next, as each the first and second plenum sections 150, 154, are of a thickness to be to be successfully drilled into, the multiple of inlet passages 134 and the multiple of outlets passages 136 are drilled into the desired first and second plenum sections 150, 154 (step 312). It should be appreciated that the passages may be drilled via laser drilling. That is, airflow direction through each internal cooling passage sections 140A-140B may be selected by the drill direction into the desired first and second plenum sections 150, 154. For example, the first plenum sections 150 may be drilled from the inner face 110 and the second plenum sections 154 are drilled from the outer face 112 to define a forward flowing section 140A (FIG. 10), or the first plenum sections 150 may be drilled from the outer face 112 and the second plenum sections 154 are drilled from the inner face 110 to define an aft flowing section 140B (FIG. 11). The number and configuration of the inlet passages 134 and the outlets passages 136 may also be modified to match engine changes through a development cycle.

Since the core is axially flowing and the inlets and exits are drilled—rather than as traditionally formed by the casting core—a change in flow direction, inlet and exit passageway configurations, as well as numbers thereof, is readily accommodated. The first and second plenum sections 150, 154 may alternatively or additionally drilled from the circumferential mate faces sides 106, 108.

The BOAS 64 advantageously manufactured with the casting core 200 may be readily modified to match engine changes through a development cycle. The casting core 200 provides the ability to practically use film cooling with RMC pedestal cores, change flow direction, and inlet and exit configurations.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A casting core for a Blade Outer Air Seal, comprising:
a first plenum section of a thickness configured to receive a drill to form an inlet passage in communication with said first plenum section;
a second plenum section of a thickness configured to receive a drill to form an outlet passage in communication with said first plenum section, at least one of the outlet passage and the inlet passage defines an angle with respect to a face of the Blade Outer Air Seal; and
a heat exchange cavity core section in communication with said first plenum section and said second plenum section, said first plenum and said second plenum section are of a thickness greater than said heat exchange cavity section, said heat exchange cavity core section includes a multiple of features defining a tortuous airflow path between the respective first and second plenum sections, wherein said first plenum section and said second plenum section each has a respective thickness greater than a thickness of said heat exchange cavity section.

2. The casting core as recited in claim 1, wherein said multiple of features comprise a multiple of pedestals defining the tortuous airflow path.

3. The casting core as recited in claim 1, wherein said multiple of features comprise a multiple of elongated strips defining the tortuous airflow path.

4. The casting core as recited in claim 1, wherein said heat exchange cavity core section is machined.

5. The casting core as recited in claim 1, wherein said heat exchange cavity core section is manufactured of a refractory metal.

6. The casting core as recited in claim 1, wherein the drill is a laser drill.

7. A Blade Outer Air Seal, comprising:
a first plenum section;
a first multiple of passages in communication with said first plenum;
a second plenum section;
a second multiple of passages in communication with said second plenum, at least one of said first multiple of passages and said second multiple of passages defines an angle with respect to a face of the Blade Outer Air Seal; and
a heat exchange cavity section in communication with at least one of said first multiple of passages, and at least one of said second multiple of passages, said heat exchange cavity core section includes a multiple of features defining a tortuous airflow path between the respective first and second plenum sections, wherein said first plenum section and said second plenum section each has a respective thickness greater than a thickness of said heat exchange cavity section.

8. The Blade Outer Air Seal as recited in claim 7, wherein said first multiple of passages are inlet passages through an outer face.

9. The Blade Outer Air Seal as recited in claim 8, wherein said second multiple of passages are exit passages through an inner face.

10. The Blade Outer Air Seal as recited in claim 7, wherein said second multiple of passages are inlet passages through an outer face.

11. The Blade Outer Air Seal as recited in claim 10, wherein said first multiple of passages are exit passages through an inner face.

12. The Blade Outer Air Seal as recited in claim 7, wherein at least one of said first and second multiple of passages are inlet passages and the other of said first and second multiple of passages are outlet passages.

13. The Blade Outer Air Seal as recited in claim 7, wherein said heat exchange cavity section includes a multiple of pedestals.

14. The Blade Outer Air Seal as recited in claim 7, wherein said heat exchange cavity section includes a multiple of elongated strips.

15. A method of manufacturing a Blade Outer Air Seal, comprising:
forming a casting core with a heat exchange cavity section in communication with a first plenum section and a second plenum section, said heat exchange cavity core section includes a multiple of features defining a tortuous airflow path between the respective first and second plenum sections, said first plenum section and said second plenum section having a thickness greater than a thickness of said heat exchange cavity section; and
laser drilling a first multiple of passages into the first plenum section and a second multiple of passages into the second plenum section, at least one of the first multiple of passages and the second multiple of passages defines an angle with respect to a face of the Blade Outer Air Seal.

16. The method as recited in claim 15, wherein the first multiple of passages are inlet passages through an outer face and the second multiple of passages are exit passages through an inner face to form a forward airflow direction.

17. The method as recited in claim 15, wherein the second multiple of passages are inlet passages through an outer face and the first multiple of passages are exit passages through an inner face to form an aft airflow direction.

18. The method as recited in claim 15, wherein forming the heat exchange cavity core section includes machining the heat exchange cavity core section of the casting core.

19. The method as recited in claim 15, wherein forming the heat exchange cavity core section includes machining the heat exchange cavity core section reducing the thickness of the heat exchange cavity core section with respect to the first and second plenum sections.

20. The method as recited in claim 15, wherein forming the casting core comprises forming the casting core of a refractory metal of a desired thickness to form the first and second plenum sections.

\* \* \* \* \*